(12) United States Patent
Lyons et al.

(10) Patent No.: US 9,199,419 B2
(45) Date of Patent: Dec. 1, 2015

(54) SYSTEM AND METHOD FOR FACILITATING FLUID MOVEMENT IN CLOSE-MOLDED COMPOSITE PARTS

(71) Applicant: The Boeing Company, Seal Beach, CA (US)

(72) Inventors: Brett I. Lyons, Chicago, IL (US); Lisa C. Carlson, Seattle, WA (US); Stanley W. Stawski, Camano Island, WA (US); Robert B. Miller, Bonney Lake, WA (US); Matt Wallen, Tucson, AZ (US); Jens Rossfeldt, Grass Valley, AZ (US)

(73) Assignee: The Boeing Company, Chicago, IL (US)

( * ) Notice: Subject to any disclaimer, the term of this patent is extended or adjusted under 35 U.S.C. 154(b) by 418 days.

(21) Appl. No.: 13/665,721

(22) Filed: Oct. 31, 2012

(65) Prior Publication Data

US 2014/0117593 A1    May 1, 2014

(51) Int. Cl.
| | |
|---|---|
| B29C 70/34 | (2006.01) |
| B29C 70/44 | (2006.01) |
| B29C 37/00 | (2006.01) |
| B29C 70/54 | (2006.01) |
| B29L 31/30 | (2006.01) |
| B29C 33/50 | (2006.01) |
| B29K 105/06 | (2006.01) |
| B29K 105/08 | (2006.01) |

(52) U.S. Cl.
CPC ........... *B29C 70/342* (2013.01); *B29C 37/0064* (2013.01); *B29C 70/446* (2013.01); *B29C 70/548* (2013.01); *B29C 33/505* (2013.01); *B29K 2105/06* (2013.01); *B29K 2105/08* (2013.01); *B29L 2031/3076* (2013.01); *B29L 2031/3082* (2013.01); *B29L 2031/3085* (2013.01)

(58) Field of Classification Search
None
See application file for complete search history.

(56) References Cited

U.S. PATENT DOCUMENTS

| | | | | |
|---|---|---|---|---|
| 2,838,435 | A | * | 6/1958 | Hewett .......................... 156/214 |
| 4,389,367 | A | | 6/1983 | Hudson |
| 4,693,678 | A | * | 9/1987 | Von Volkli ................. 425/405.1 |

(Continued)

FOREIGN PATENT DOCUMENTS

| | | |
|---|---|---|
| DE | 19853709 | 2/2000 |
| DE | 10203975 | 1/2003 |

(Continued)

OTHER PUBLICATIONS

PCT/US2013/061715 International Search Report dated Feb. 5, 2014.

(Continued)

*Primary Examiner* — Monica Huson

(57) ABSTRACT

A vacuum bagging system may include a layer assembly defining a fluid flow channel. The layer assembly may include a contact layer mounted to a composite part positionable within an outer mold line (OML) tool. The contact layer may have a contact layer width defined by opposing contact layer side edges. The layer assembly may further include an inner layer mounted to the contact layer and having inner layer side edges located between the contact layer side edges. The fluid flow channel may extend along at least a portion of the composite part to at least one part end. The vacuum bagging system may include an internal vacuum bag positionable against the inner layer. An inner mold line (IML) tool may support the internal vacuum bag. The contact layer width may be less than an IML tool width.

11 Claims, 9 Drawing Sheets

(56) References Cited

U.S. PATENT DOCUMENTS

2002/0149134 A1* 10/2002 Hemphill et al. ............ 264/255
2009/0014919 A1    1/2009  Rossfeldt et al.
2010/0000667 A1    1/2010  Funnell
2010/0237531 A1    9/2010  Lyons et al.

FOREIGN PATENT DOCUMENTS

| | | |
|---|---|---|
| DE | 102010062871 | 6/2011 |
| EP | 1310351 | 5/2003 |
| EP | 1555104 | 7/2005 |
| EP | 1800825 | 6/2007 |
| GB | 2040790 | 9/1980 |

OTHER PUBLICATIONS

PCT/US2013/061715, International Preliminary Report on Patentability, dated May 5, 2015.

* cited by examiner

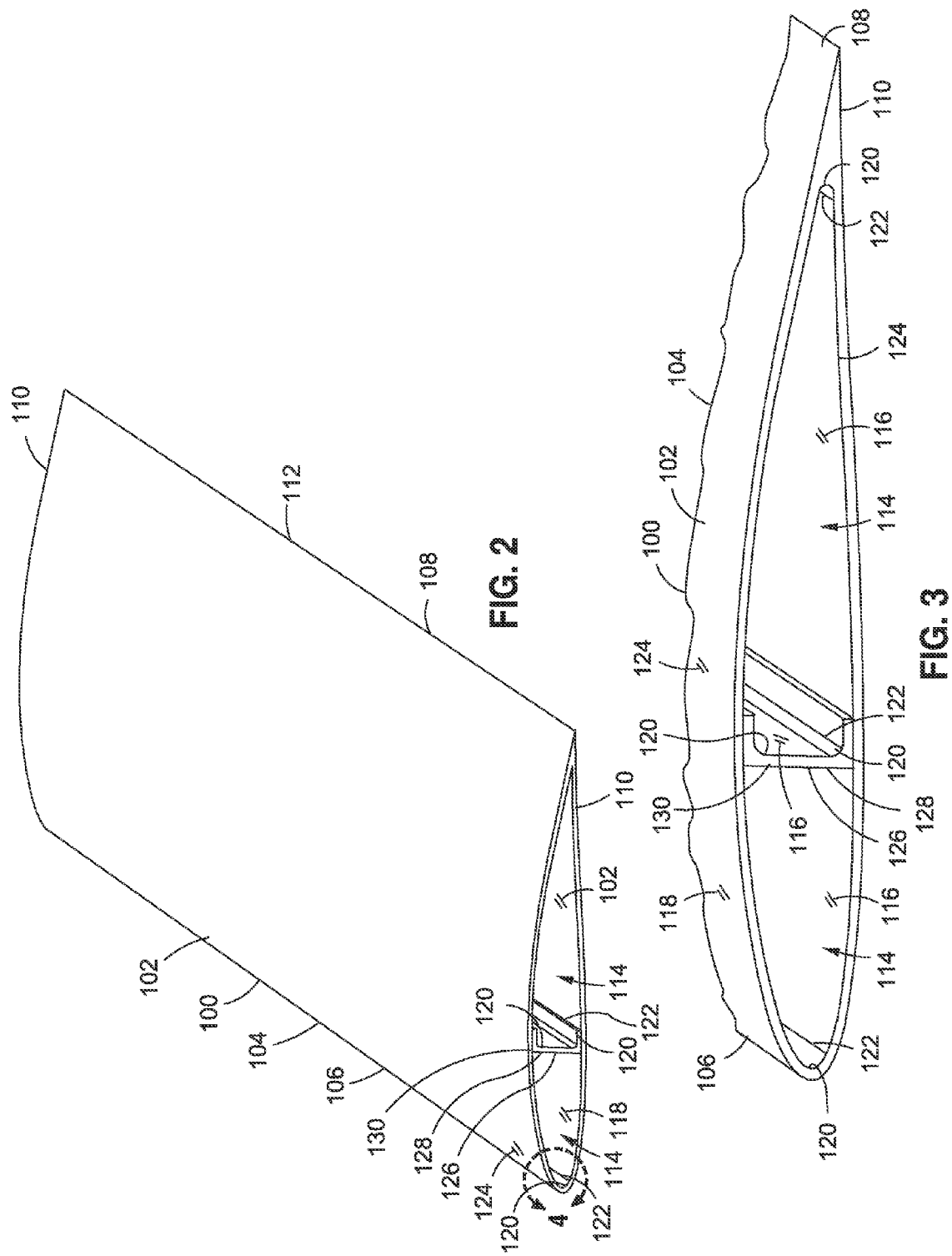

SYSTEM AND METHOD FOR FACILITATING FLUID MOVEMENT IN CLOSE-MOLDED COMPOSITE PARTS

FIELD

The present disclosure relates generally to composites manufacturing and, more particularly, to the manufacturing of composite articles having hollow interiors

BACKGROUND

Composite structures are used in a wide variety of applications. In aircraft construction, composites are used in increasing quantities to form the fuselage, wings, and other components of the aircraft. The wings of an aircraft are generally hollow structures that may require a smooth and dimensionally-accurate outer mold line (OML) surface. The wings may be constructed of composite skin members and may include internal components such as ribs, spars, and/or stiffeners to increase the strength and bending stiffness of the wings.

In conventional construction techniques for forming three-dimensional composite structures such as an aircraft wing, cured composite components such as wing spars may be assembled to composite skin members by mechanical fastening. The process of assembling the composite components may require the use of a large quantity of mechanical fasteners and specialized tooling for maintaining the relative positions of the composite components. Unfortunately, the process of forming cured composite components in a separate step and then later assembling such components using mechanical fasteners is a time-consuming and labor-intensive process.

A composite structure may also be formed by fitting together uncured composite components using a tool. Consolidation of the composite components may require a path for evacuation of gas from the part interior during the application of vacuum pressure to the tool. The path may also be required for resin movement when the composite material is heated to allow for uniform compaction pressure of the composite part against the tool surface.

Unfortunately, conventional composite tools require a relatively thick stack-up of materials against the surface of the composite part to provide a path for evacuation of gas. For composite parts having relatively tight geometry, the relatively thick stack-up of materials against the part surface presents challenges in applying uniform compaction pressure. Conventional methods may resort to multiple consolidation steps in an attempt to consolidate composite parts.

As can be seen, there exists a need in the art for a system and method for providing a low-thickness path for the evacuation of gas from a composite part such as during consolidation and which also allows for resin movement.

SUMMARY

The above-noted needs associated with composite tooling systems are specifically addressed and alleviated by the present disclosure which provides a vacuum bagging system that may include a layer assembly defining a fluid flow channel. The layer assembly may include a contact layer mounted to a composite part having three-dimensional geometry and being positionable within an outer mold line (OML) tool. The contact layer may have a contact layer width defined by opposing contact layer side edges. The layer assembly may further include an inner layer mounted to the contact layer and having inner layer side edges located between the contact layer side edges. The fluid flow channel may extend along at least a portion of the composite part to at least one part end. The vacuum bagging system may include an internal vacuum bag that may be positionable against the inner layer. An inner mold line (IML) tool may support the internal vacuum bag. The contact layer width may be less than an IML tool width.

In a further embodiment, disclosed is a vacuum bagging system for processing a composite part. The vacuum bagging system may include a layer assembly defining a fluid flow channel. The layer assembly may include a contact layer mounted to a part inner surface of a composite part positionable within an outer mold line (OML) tool. The contact layer may have a contact layer width defined by opposing contact layer side edges. The layer assembly may further include an inner layer mounted to the contact layer and having inner layer side edges located between the contact layer side edges. The fluid flow channel may extend along at least a portion of the composite part to at least one part end. The vacuum bagging system may include an internal vacuum bag positionable against the inner layer. An inner mold line (IML) tool may support the internal vacuum bag. The contact layer width may be less than an IML tool width.

Also disclosed is a method of forming a fluid flow channel in a vacuum bagging system. The method may include mounting a contact layer to a part inner surface of a composite part that may be positionable within an OML tool. The contact layer may have a contact layer width defined by opposing contact layer side edges. The method may further include mounting an inner layer to the contact layer wherein the inner layer may have an inner layer width that is no greater than the contact layer width. The inner layer may have inner layer side edges that may be positioned between the contact layer side edges. The method may include extending the contact layer to at least one part end of the composite part, and positioning an internal vacuum bag on a side of the inner layer opposite the contact layer. The internal vacuum bag may cover an IML tool having an IML tool width. The contact layer width may be less than the IML tool width.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is a perspective view of a composite part that may be fabricated using the tooling system of FIG. 1;

FIG. 3 is an enlarged perspective view of the composite part illustrating the three-dimensional geometry and inside corners of the composite part;

DETAILED DESCRIPTION

Figure 1:
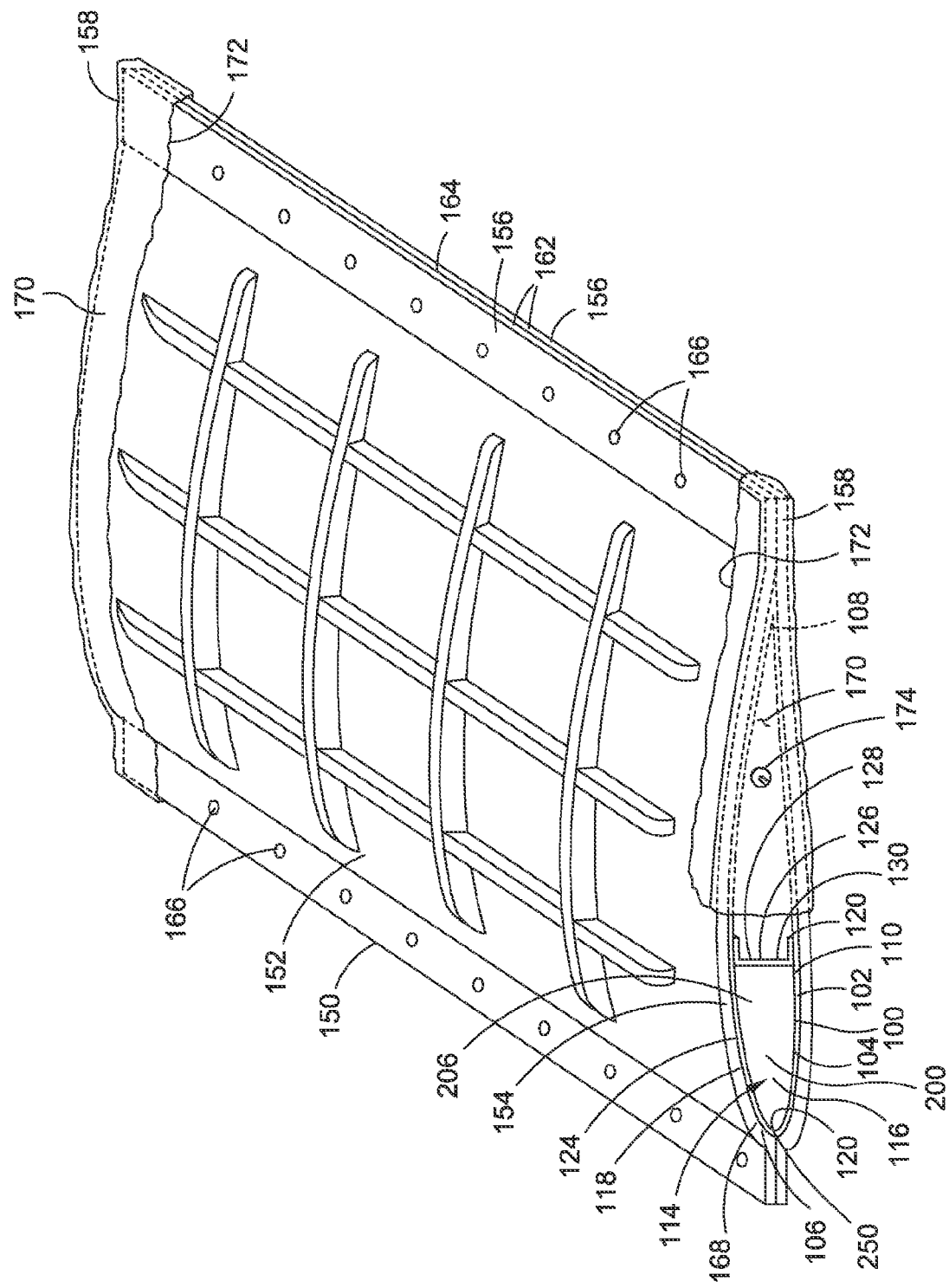
FIG. 1 is a perspective view of an embodiment of a closed mold tooling system having an outer mold line (OML) tool and one or more inner mold line (IML) tools positioned within a hollow part interior of a composite part that may be processed within the OML tool.

Referring now to the drawings wherein the showings are for purposes of illustrating preferred and various embodiments of the disclosure, shown in FIG. 1 is a closed mold tooling system 150 as may be implemented for processing a composite part 100. The composite part 100 may have a three-dimensional geometry 130. The closed mold tooling system 150 may include an outer mold line (OML) tool 152 and one or more inner mold line (IML) tools 200. Each IML tool 200 may include one or more internal vacuum bagging systems 250. One or more of the vacuum bagging systems 250 may advantageously include one or more fluid flow channels 252 (FIG. 4) which may facilitate the evacuation of trapped air, gas, volatiles, and other by-products that may be generated during the processing (e.g., consolidation, curing, co-curing, co-bonding, etc.) of the composite part 100. In addition, the fluid flow channels 252 may facilitate the movement of liquid resin to facilitate the application of uniform compaction pressure during consolidation of the composite part 100. Advantageously, each fluid flow channel 252 may be configured in a relatively narrow width and a relatively thin stack-up of materials to facilitate consolidation of relatively tight geometry including inside corners 120 having a relatively small radius.

In FIG. 1, the embodiment of the OML tool 152 may be comprised of two OML tool halves 156 collectively defining an OML tool surface 154. The OML tool surfaces 154 may define the part outer surface 118 for the composite part 100. The OML tool 152 may encapsulate the composite part 100 and one or more IML tools 200. Each IML tool 200 may comprise a bag carrier or a mandrel that may be positioned within the part interior 114 of the composite part 100. The OML tool 152 may be formed of Invar or any metallic or non-metallic material including composite material (e.g., carbon fiber) that is compatible with the composite part 100 with regard to the coefficient of thermal expansion of the composite part 100 material. The tool halves 156 may include tool flanges 162 to facilitate mating of the tool halves 156 along a tool seam 164 using a plurality of mechanical fasteners 166 or other means.

The OML tool 152 may include external ribs or other stiffening members which may extend lengthwise and/or chordwise along the OML tool 152 and which may provide the OML tool 152 with sufficient stiffness to react internal compaction pressure generated by the internal vacuum bags 206 for consolidating the composite part 100. In addition, the OML tool 152 may also be configured with sufficient stiffness to react autoclave pressure under repeated cycles at relatively high processing (e.g., consolidating, curing, molding, glass transition, etc.) temperatures. The OML surface 154 may have a relatively high level of surface finish (e.g., a relatively low level of surface roughness) to provide a smooth surface finish to the composite part 100.

In FIG. 1, the illustrated embodiment of the OML tool 152 may include one or more tool ends 158 that may be generally open. External vacuum bags 170 may be sealed over the tool ends 158 using a bag edge sealant 172 (not shown) such as vacuum bag sealant or a high-temperature vacuum bag sealant tape to sealingly enclose the tool interior 168. One or more of the external vacuum bags 170 may be fluidly coupled to a vacuum source 174 such that vacuum pressure may be applied to the tool interior 168 to generate internal compaction pressure against the part inner surface 116 of the composite part 100 for consolidation thereof. Although not shown, the OML tool 152 may optionally include one or more rigid end caps that may be mounted to one or more of the tool ends 158 for embodiments wherein each IML tool 200 comprises an expandable mandrel for generating internal compaction pressure against the part inner surface 116 of the composite part 100.

Referring to FIG. 2, shown is an embodiment of a composite part 100 that may be fabricated using the vacuum bagging system 250 and method disclosed herein. The IML tools 200 have been omitted from the part interior 114 of the composite part 100. In the embodiment shown, the composite part 100 may comprise an aerodynamic structure 104 having a leading edge 106, a trailing edge 108, and opposing part ends 110. The composite part 100 may be comprised of one or more skins 124 and one or more internal components 126. The skin 124 and/or the internal components 126 may be formed as a composite layup 102 such as a laminate of uncured or pre-cured composite material such as, but not limited to, pre-impregnated fiber-reinforced material (e.g., pre-preg). In this regard, one or more of the composite layups 102 may comprise thermosetting composite material, thermoplastic composite material, pre-impregnated composite material, and/or resin-infused composite material polymer matrix. The composite layup 102 may include carbon fibers, glass fibers, ceramic fibers, or other fiber types which may be unidirectional, woven, chopped, or other fiber arrangements. The composite layup 102 may include a polymeric material or resin matrix such as epoxy. The resin matrix may comprise a thermosetting resin, or the resin matrix may comprise a thermoplastic resin.

The tooling system 150 may facilitate the co-bonding and/or co-curing of the composite layup 102 of the skin 124 with one or more composite layups 102 of the internal components 126 during the application of heat and internal compaction pressure. Advantageously, the vacuum bagging system 250 and method disclosed herein provides for the application of substantially uniform internal compaction pressure to the composite part 100 positioned between the IML tools 200 and the OML tool 152. During the application of the internal compaction pressure, the composite part 100 may be heated to a predetermined temperature for a predetermined period of time to allow for consolidation and curing of the composite part 100 into a unitized, monolithic composite structure.

Advantageously, the vacuum bagging system 250 and method disclosed herein provides a means for forming a hollow composite article without the need for assembling separate components such as by bonding or mechanical fastening. In this regard, the vacuum bagging system 250 and method provides a means for manufacturing composite articles having complex three-dimensional geometry. Such three-dimensional geometry 130 may include internal components 126 such as composite stiffeners or other components that extend laterally from the part inner surfaces of one or more skins 124. For example, the composite part 100 shown in FIG. 1 includes an internal composite spar 128 that extends between the part inner surfaces 116 of the opposing composite skins 124 of the composite part 100.

The vacuum bagging system 250 and method disclosed herein advantageously provides a means for producing unitized, integrally-formed, composite parts 100 having dimensionally-accurate part inner surfaces 116 and dimensionally-accurate part outer surfaces 118. The vacuum bagging system 250 may be implemented for manufacturing an aerodynamic structure 104 such as a wing, a fuselage, a control surface, a winglet, or any one of a variety of other aerodynamic structures 104 such as for an aircraft. Although the present disclosure is described in the context of an aerodynamic structure 104 having a leading edge 106 and trailing edge 108, the vacuum bagging system 250 may be implemented for manufacturing aerodynamic structures 104 or non-aerodynamic structures of any size, shape, and configuration, and for any vehicular application or non-vehicular application, without limitation.

Referring to FIG. 3, shown is a view of the composite part 100 illustrating one or more inside corners 120 that may be consolidated with the application of substantially uniform compaction pressure due to fluid flow channels 252 (FIG. 4) that may be included with the vacuum bagging system 250 and method disclosed herein. As described below, the fluid flow channels 252 may be positioned adjacent to relatively tight geometry on the part inner surface 116 to facilitate the evacuation of trapped air, gas, and other fluids 254 from the composite layup 102. For example, fluid flow channels 252 may be positioned adjacent to and outside of the tangent lines 122 that define the boundaries of the inside corners 120 of the composite part 100. Such inside corners 120 may have a relatively small radius at a leading edge 106 or trailing edge 108 of an aerodynamic structure 104. Inside corners 120 or tight geometry may also occur at the juncture of internal components 126 such as spars with the part inner surface 116 of the skins 124.

Figure 4:
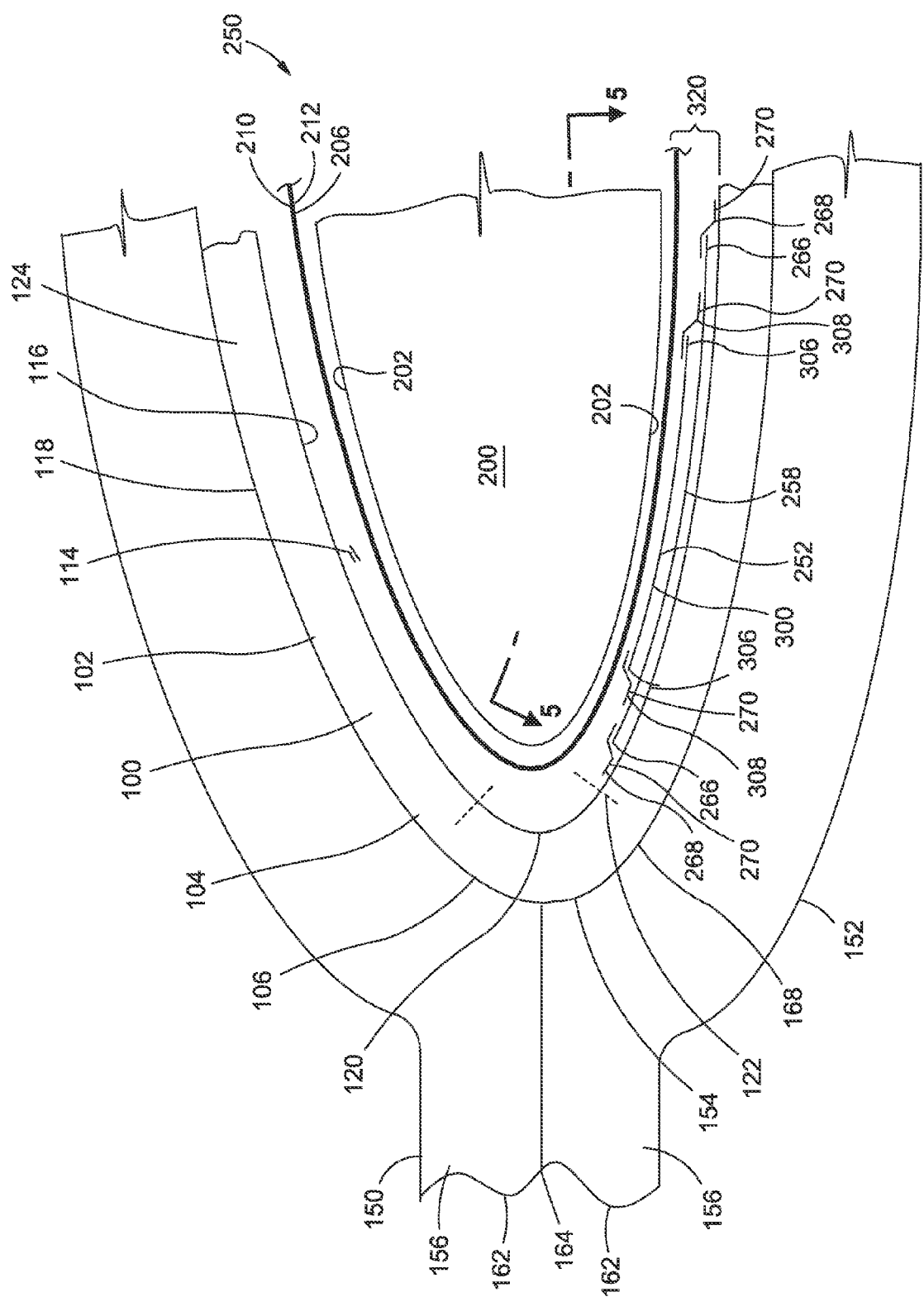
FIG. 4 is a schematic side view of the tooling system taken along line 4 of FIG. 1 and illustrating an embodiment of a vacuum bagging system having a contact layer, an inner layer, and an internal vacuum bag collectively forming a fluid flow channel for evacuating fluid such as gas from the composite part interior.

Referring to FIG. 4, shown is a schematic side view of a vacuum bagging system 250 having a fluid flow channel 252. In the embodiment shown, the fluid flow channel 252 may be defined by a layer assembly 320 comprised of a plurality of films or layers. For example, the layer assembly 320 may include a contact layer 258 mounted to a part inner surface 116 of the composite part 100. The contact layer 258 may be removably secured to the part inner surface 116 of the composite part 100 at one or more discrete locations along the contact layer length 262. For example, the contact layer 258 may be removably secured to the composite part 100 with pressure-sensitive adhesive tape 270 at one or more discrete location or continuously along the contact layer 258 length. However, the contact layer 258 may be removably secured to the composite part 100 using any removable contact layer attachment device 268 including adhesive that may be removably applied to the part-side surface of the contact layer 258. The adhesive may preferably be chemically compatible with the material (e.g., resin, fiber reinforcement) of the composite part 100 under all temperature and pressure conditions during processing of the composite part 100.

In an embodiment, the contact layer 258 may be removably secured to the composite part 100 such that the contact layer side edge 266 is located adjacent to and outside of relatively small inside corners 120 (e.g., less than approximately 1.0 inch radius) of the composite part 100. Such inside corners 120 may occur at a variety of different locations within the composite part 100. For example, inside corners 120 having relatively small radii may occur at the leading edge 106, the trailing edge 108, and within the geometry of the internal components 126 such as in the spar 128 of the aerodynamic structure 104 illustrated in FIG. 4. In an embodiment, the contact layer side edge 266 nearest an inside corner 120 may be located within approximately three (3) inches of the tangent line 122 of the inside corner 120 to allow for gas evacuation in the inside corner 120. As described below, the contact layer 258 may be formed of a material that may be relatively stiffer than the internal vacuum bag 206 material such that positioning the contact layer 258 within the inside corner 120 may prevent the application of uniform internal compaction pressure on the inside corner 120. However, by locating the contact layer 258 outside of such inside corner 120, the relatively flexible internal vacuum bag 206 may extend into the inside corner 120 and apply a uniform internal compaction pressure which may avoid bridging and may lead to improved compaction and reduced porosity in the composite part 100.

In FIG. 4, the layer assembly 320 may also include one or more inner layers 300 that may be mounted to or attached to the contact layer 258. The contact layer 258 may have a contact layer width 264 defined by opposing contact layer side edges 266. Likewise, the inner layer 300 may have an inner layer width 304 defined by opposing inner layer side edges 306. The inner layer width 304 may be less than the contact layer width 264. Furthermore, the inner layer 300 may be positioned such that the inner layer side edges 306 are located between the contact layer side edges 266. However, an inner layer side edge 306 may be aligned with a contact layer side edge 266. As described in greater detail below, the layer assembly 320 defining the fluid flow channel 252 may extend along at least a portion of the composite part 100 and may terminate at one or more part ends 110 to allow for evacuation of gas from the part interior 114. The fluid flow channel 252 may also facilitate the flow of liquid resin during the consolidation process.

In FIG. 4, the vacuum bagging system 250 may include the internal vacuum bag 206 that may be positioned on a side of the inner layer 300 opposite the contact layer 258. The internal vacuum bag 206 may be supported by the IML tool 200. The IML tool 200 may comprise a bag carrier and/or a mandrel for supporting the vacuum bag. The bag carrier may be hollow and may be formed of composite, polymer, ceramic, or metallic material that may preferably have a coefficient of thermal expansion that is compatible with the composite part 100. However, the IML tool 200 may comprise a mandrel or other IML tool 200 configuration and is not limited to a bag carrier.

The IML tool 200 may be located on a side of the internal vacuum bag 206 opposite the inner layer 300. The IML tool 200 may have an IML tool width 204. For example, in FIG. 4, the composite part 100 may include two IML tools 200. One of the IML tools 200 may have an IML tool width 204 that may extend between the leading edge 106 and the spar 128 of the composite part 100. The other IML tool 200 may have an IML tool width 204 that may extend between the spar 128 and the trailing edge 108 of the composite part 100. In an embodiment, the contact layer width 264 is relatively narrow (e.g., 0.5 to 3.0 inches) and may be less than the IML tool width 204.

The inner layer 300 is preferably fixedly positioned relative to the contact layer 258 such that at no time do the inner layer side edges 306 move past the contact layer side edges 266.

The inner layer 300 may be removably secured to the contact layer 258 using one or more contact layer attachment devices 268 at one or more discrete locations along the inner layer 300 length. For example, the inner layer 300 may be removably secured to the contact layer 258 with pressure-sensitive adhesive tape 270 at one or more discrete locations or continuously along the inner layer 300 length. However, the inner layer 300 may be attached to the contact layer 258 using other means such as stitching and/or heat welding in a manner such that the inner layer side edges 306 do not move past the contact layer side edges 266.

In FIG. 4, the internal vacuum bag 206 may be formed as an assembly of two layers of material including a part-side bag layer 210 and a non-part side layer. The part-side bag layer 210 may be in contact with the inner layer 300. As described in greater detail below, the part-side bag layer 210 may be formed of material that is chemically non-reactive with composite part material. The non-part-side bag layer 212 of the internal vacuum bag 206 may be chemically compatible with the composite part material. As described below, the two materials of the part-side bag layer 210 and the non-part-side bag layer 212 may be bonded together with an adhesive or the two materials may be integrally formed such as by extruding the internal vacuum bag 206. The non-part-side bag layer 212 may be in contact with the IML tool 200. The internal vacuum bag 206 functions as a gas seal barrier and may provide uniform internal compaction pressure on the part inner surface 116.

In FIG. 4, the IML tool 200 comprises at least one of a bag carrier and a mandrel or other configuration for supporting the vacuum bag. Each one of the IML tools 200 may be sized, shaped, and configured to provide a substantially net fit with minimal gap between the IML tool surface 202 and the part inner surface 116 of the composite part 100. In an embodiment, the composite part 100 may include multiple IML tools 200 each having an internal vacuum bag 206 enclosing the IML tool 200. Two or more of the IML tools 200 may be configured to provide a net fit with internal components 126 such as a spar 128 of the composite part 100.

Advantageously, the fluid flow channel 252 of the internal vacuum bagging system 250 has a relatively narrow width and a relatively small collective layer assembly thickness 322 as described below. The layer assembly thickness 322 is collectively defined by the thicknesses 260, 302, 208 of the contact layer 258, the inner layer 300, and the internal vacuum bag 206. By minimizing the width of the fluid flow channel 252, a majority of the part inner surface 116 is in direct contact with the relatively thin internal vacuum bag 206. In this manner, the gap between the IML tool 200 (e.g., bag carrier) and the part inner surface 116 along the majority of the composite part 100 may be minimized. By minimizing the gap between the IML tool 200 and the part inner surface 116, movement of the fiber-reinforced material such as in the internal components 126 (e.g., spar 128) may be minimized during consolidation and curing and which may minimize waviness in the cured composite part 100 and may improve dimensional accuracy in the cured composite part 100.

Figure 5:
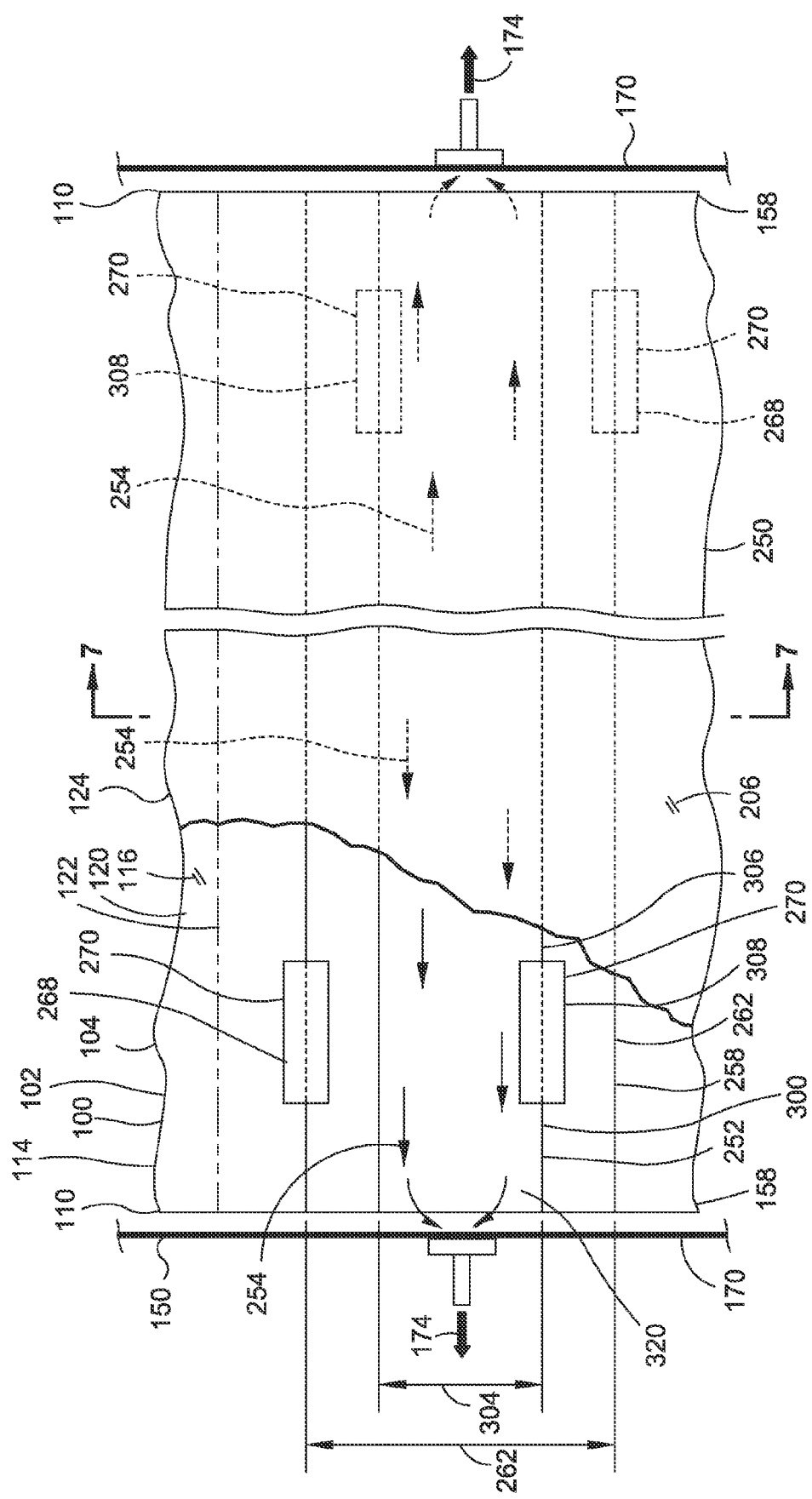
FIG. 5 is a flat pattern view of the vacuum bagging system taken along line 5 of FIG. 4 and illustrating an embodiment of the fluid flow channel and the evacuation of fluid under vacuum pressure.

Referring to FIG. 5, shown is a flat pattern view of an embodiment of a fluid flow channel 252 of the vacuum bagging system 250 and illustrating the evacuation of fluid 254 under vacuum pressure. The layer assembly 320 defining the fluid flow channel 252 is located adjacent to a tangent line 122 of an inside corner 120 of the composite part 100. However, the layer assembly 320 may be installed at any location along the composite part 100 and is not limited to locations that are adjacent to inside corners 120 of the composite part 100. As indicated above, the layer assembly 320 may comprise at least one contact layer 258 mounted to the composite part 100 with one or more contact layer attachment devices such as adhesive tape 270 positioned at one or more discrete locations.

The layer assembly 320 may further include one or more inner layers 300 mounted to the contact layer 258 using one or more inner layer attachment devices 308 such as adhesive tape 270 positioned at one or more discrete locations. The inner layer width 304 may be less than the contact layer width 264. The fluid flow channel 252 is bounded by the internal vacuum bag 206. The layer assembly 320 in FIG. 5 is shown as a relatively straight fluid flow channel 252 and is shown oriented along a lengthwise direction of the composite part 100. However, the layer assembly 320 may be formed in a non-straight configuration and is not limited to a relatively straight configuration as shown. Furthermore, the layer assembly 320 may be oriented in any direction relative to the composite part 100 and is not limited to a lengthwise direction.

In FIG. 5, the vacuum bagging system 250 may include one or more external vacuum bags 170 that may be applied over the OML tool 152 such as an external vacuum bag 170 applied at each tool end 158. One or more of the external vacuum bags 170 may include one or more vacuum ports (not shown) to fluidly couple the vacuum source 174 to one or more fluid flow channels 252 that may be formed on the composite part 100 between the part inner surface 116 and the internal vacuum bag 206. The vacuum sources 174 may draw a vacuum on the tool interior 168 in such a manner causing compaction of the composite part 100 between the OML tool surface 154 and the internal vacuum bag 206, and the evacuation of fluid 254 such as gas out of the composite part 100 and into the fluid flow channel 252 for discharge through the vacuum port.

Figure 6:
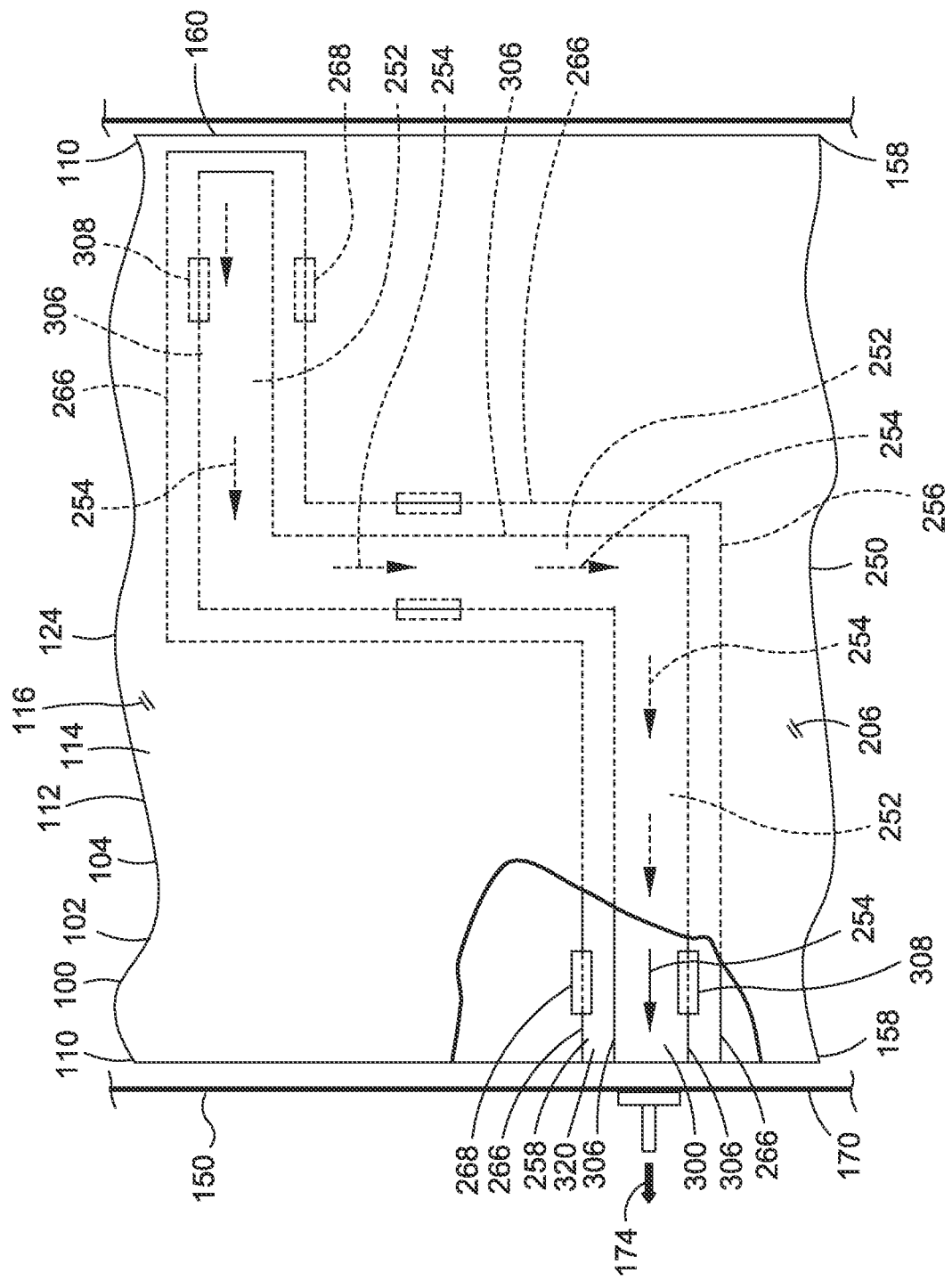
FIG. 6 is a flat pattern view of an alternative embodiment of the vacuum bagging system having a fluid channel network comprised of a plurality of fluid flow channels.

Referring to FIG. 6, shown is a flat pattern view of a flow channel network comprising a plurality of fluid flow channels 252. Each one of the fluid flow channels 252 may comprise a contact layer 258 removably mounted to the part inner surface 116 at one or more discrete locations. Each one of the fluid flow channels 252 may further comprise one or more inner layers 300 that may be attached to one or more of the contact layers 258. The OML tool 152 in FIG. 6 has a closed end 160 with no external vacuum bag 170 or connection to a vacuum source 174. An opposite end of the OML tool 152 is sealed with an external vacuum bag 170 having a vacuum port for coupling to a vacuum source 174. In this regard, FIG. 6 represents one of a variety of different configurations of fluid flow channels 252 that may be implemented in a vacuum bagging system 250 to facilitate evacuation of fluid 254 such as gas from an interior of a composite part 100.

Figure 7:
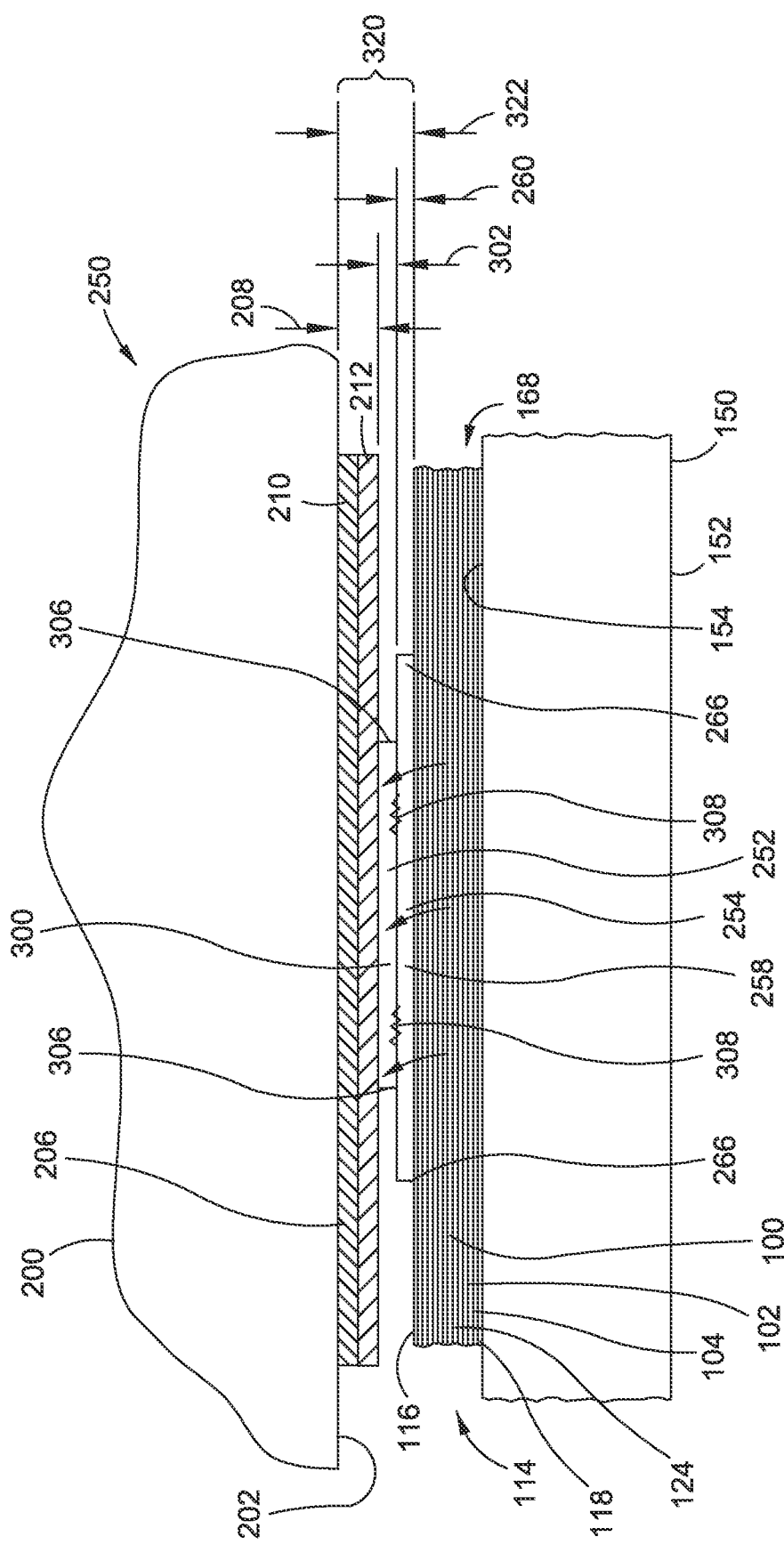
FIG. 7 is a schematic side view of an embodiment of a vacuum bagging system having a single inner layer positioned between the contact layer and the internal vacuum bag.

Referring to FIG. 7, shown is a schematic view of an embodiment of a vacuum bagging system 250 having a single inner layer 300 attached to the contact layer 258. Although not shown, the contact layer 258 may be removably attached to the part inner surface 116 such as with adhesive tape 270. The contact layer 258 may be formed of a material that is chemically compatible with the composite part material. For example, the contact layer 258 may be formed of fluorinated ethylene propylene (FEP) and commercially available as Teflon™. However, the contact layer 258 may be formed of any material that is chemically compatible with the composite part 100 and which is preferably chemically non-reactive with the resin and/or the fiber reinforcement of the composite part 100.

In an embodiment, the contact layer 258 may have a contact layer width 264 that is less than approximately ten (10) inches. In a further embodiment, the contact layer width 264 may be between approximately 0.5 and 3.0 inches. The contact layer 258 may have a contact layer thickness 260 of no greater than approximately 0.005 inch although the contact layer 258 may be provided in a thickness greater than 0.005 inch. In an embodiment, the contact layer 258 may have a contact layer thickness 260 of between approximately 0.001 and 0.005 inch. The contact layer 258 may be porous in a through-thickness direction to facilitate the movement of fluid 254 such as gas, liquid resin, or by-products through the contact layer 258 and into the inner layer 300. The contact layer 258 may also be porous along a contact layer length 262. A lengthwise direction may be defined as the direction toward a part end or toward a tool end 158 of the OML tool 152. A tool end 158 may be defined as an end of the composite part 100 where the OML tool 152 is open to the exterior environment and/or where the OML tool 152 may be sealed with an external vacuum bag 170.

In FIG. 7, the inner layer 300 may be formed of a material that is chemically compatible with the composite part material. In addition, the inner layer 300 may be formed of a material that is non-outgassing and non-liquid-producing at processing temperatures (e.g., resin curing temperature, adhesive curing temperature, consolidating temperature, glass transition temperature, etc.) associated with the composite part 100. The inner layer 300 is preferably formed of a material that remains flexible when elevated to the processing temperature of the composite part 100. The inner layer 300 may be formed of a material that may be removed from the composite part 100 following curing. In an embodiment, the inner layer 300 may be formed of a polyamide material such as a material commercially available as Nylon™. In an embodiment, the inner layer 300 may be formed of woven Nylon™ fabric that may be coated with a release agent to facilitate removal from the composite part 100.

In an embodiment, the inner layer 300 may have an inner layer thickness 302 of no greater than approximately 0.050 inch although the inner layer 300 may be provided in a thickness greater than 0.050 inch. In an embodiment, the inner layer 300 may be provided in a thickness of between approximately 0.001 and 0.050 inch. The inner layer 300 may be porous or contoured along a through-thickness direction and along an inner layer 300 length to allow air, gas, liquid resin, and other by-products to move into and through the inner layer 300 toward the composite part 100 end for discharge out of the OML tool 152.

In FIG. 7, the internal vacuum bag 206 may be positioned on a side of the inner layer 300 opposite the contact layer 258. The internal vacuum bag 206 may be provided as a multi-material vacuum bag that provides a gas seal barrier to the IML tool 200. As indicated above, the internal vacuum bag 206 may be comprised of a part-side bag layer 210 and a non-part-side bag layer 212 in contact with the inner layer 300 and the IML tool 200, respectively. The part-side bag layer 210 may be formed of material that is chemically non-reactive with the resin of the composite material. In an embodiment, the part-side bag layer 210 may be formed of fluorinated ethylene propylene (FEP). The FEP may be applied to the non-part side bag layer 212 by adhesive bonding, coating, or integrally forming with the non-part side bag layer 212 such as by extruding the FEP with the non-part-side bag layer 212 material. The non-part-side bag layer 212 may be formed of polymeric material that is compatible with the part-side bag layer 210 and with the IML tool 200. The part-side 210 and non-part-side bag layer 212 materials and any joining adhesive preferably have a net stiffness such that during stretching under the application of vacuum pressure, the internal vacuum bag 206 may strain within the plastic deformation stress limits of the layer materials and the adhesive under the processing temperatures associated with the consolidating and curing the composite part 100.

In Figure the 7, the internal vacuum bag 206 may have a thickness of no greater than approximately 0.020 inch although thicknesses of greater than 0.020 inch are contemplated for the internal vacuum bag 206. In an embodiment, the internal vacuum bag 206 may have a thickness of between approximately 0.003 to 0.010 inch. The fluid flow channel 252 preferably has a relatively low stack-up thickness. In an embodiment, the contact layer 258, the inner layer 300, and the internal vacuum bag 206 may have a total layer assembly thickness 322 of no greater than approximately 0.10 inch although the layer assembly thickness 322 may be greater than 0.10 inch. By minimizing the layer assembly thickness 322, the gap between the IML tool 200 (e.g., bag carrier) and the part inner surface 116 may be minimized which may improve the dimensional accuracy of the cured composite part 100.

Figure 8:
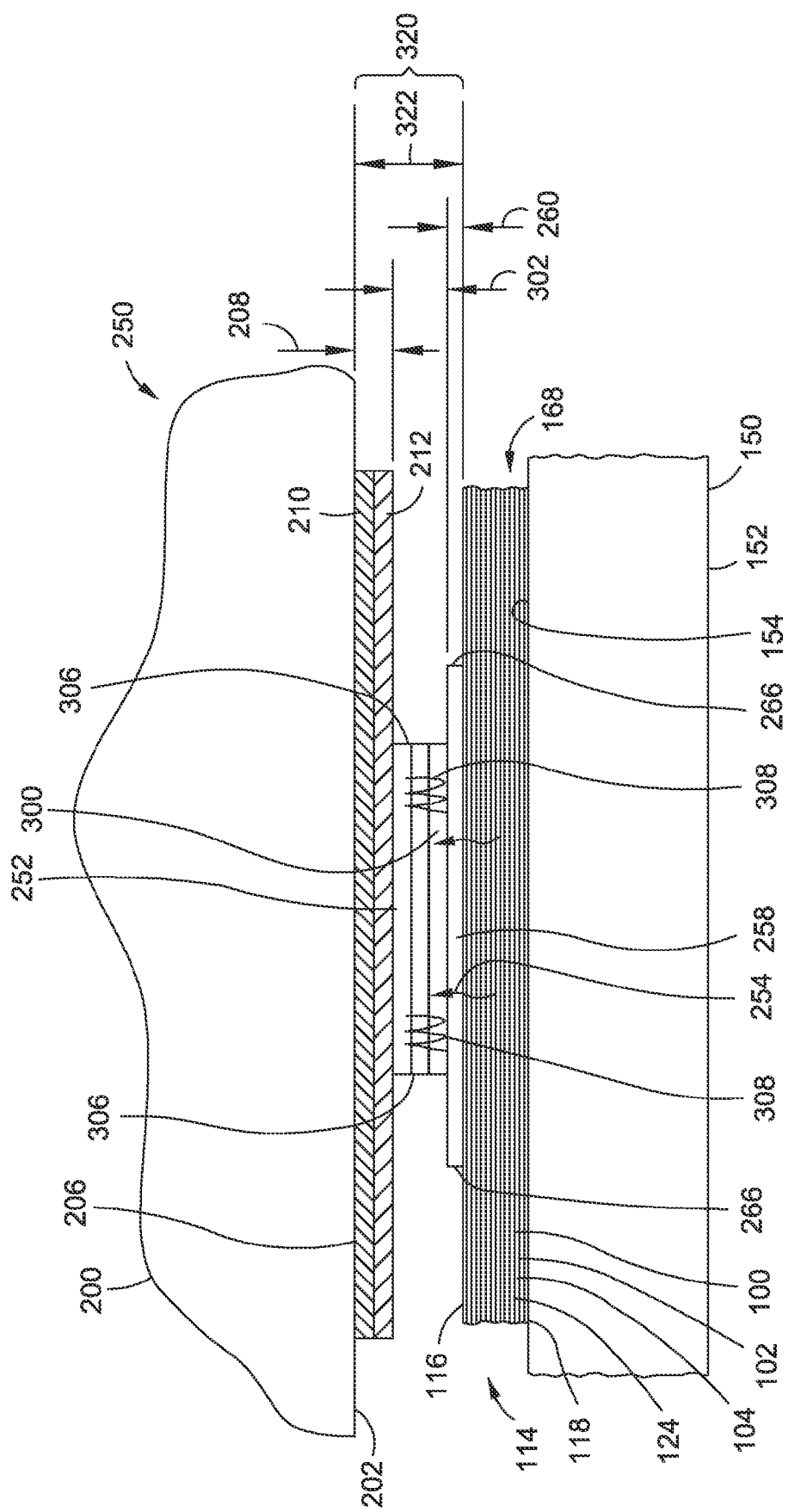
FIG. 8 is a schematic side view of an embodiment of a vacuum bagging system having a plurality of inner layers positioned between the contact layer and the internal vacuum bag.

Referring to FIG. 8, shown is a schematic view of an embodiment of a vacuum bagging system 250 having a plurality of inner layers 300 attached to the contact layer 258. By providing a plurality of inner layers 300, the flow of gas and/or liquid resin may be increased relative to the flow through a fluid flow channel 252 having a single inner layer 300. Each one of the inner layers 300 may be formed of the above-described inner layer 300 materials described above. Each one of the inner layers 300 may have an inner layer width 304 that is less than the contact layer width 264. In addition, each one of the inner layers 300 may have an inner layer thickness 302 that is no greater than approximately 0.050 inch although each inner layer 300 may have a thickness greater than 0.050 inch. The plurality of inner layers 300 may be attached together using chemically compatible adhesive tape 270, by stitching, by heat welding, or by any one of a variety of other means for interconnecting the inner layers 300 in a manner such that the inner layers 300 do not move past the contact layer side edge 266. As indicated above, the layer assembly thickness 322 of the contact layer 258, the inner layer 300, and the internal vacuum bag 206 is preferably, but optionally, no greater than approximately 0.10 inch.

Figure 9:
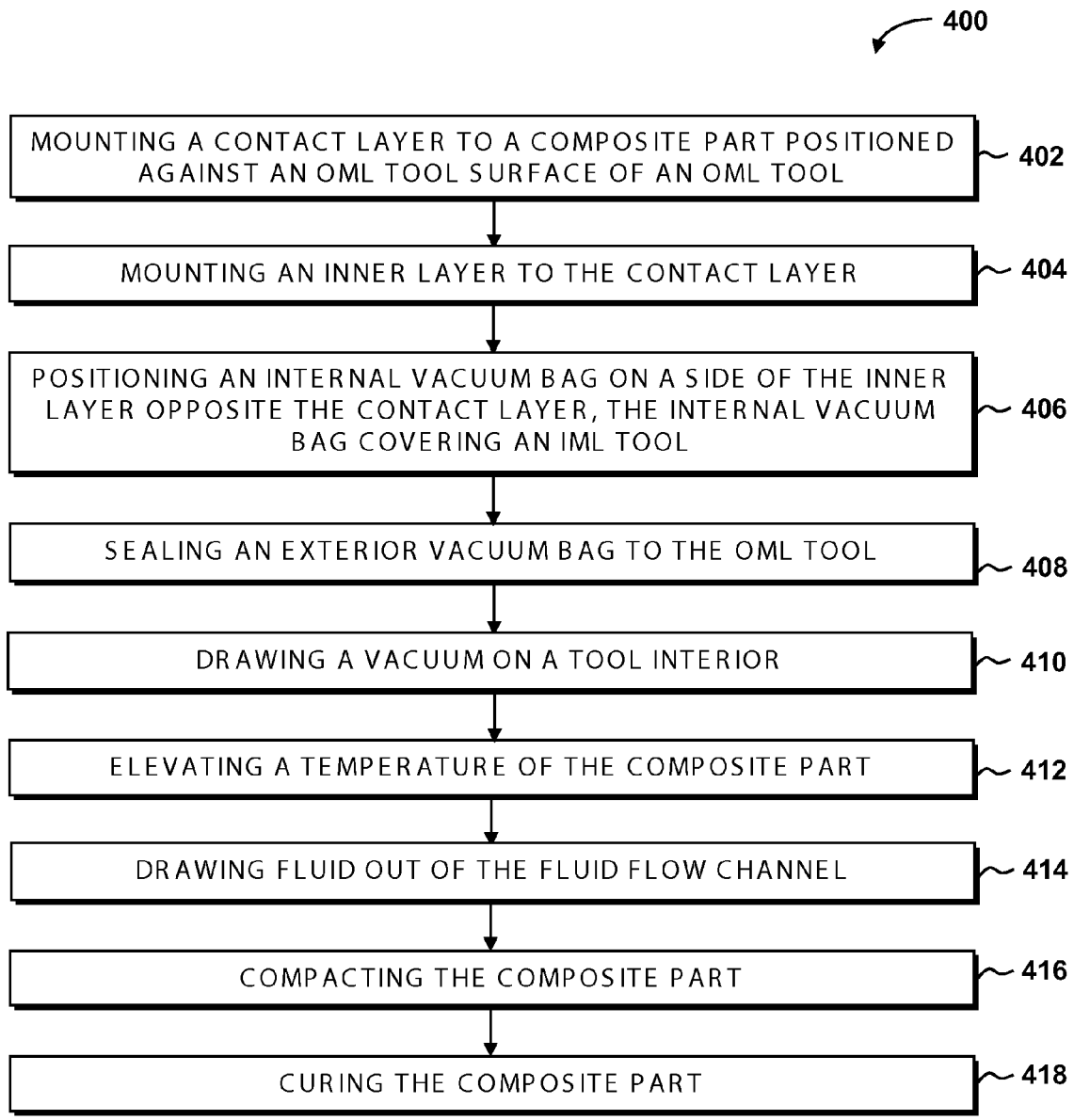
FIG. 9 is a flow diagram illustrating one or more operations that may be included in a method of forming a fluid flow channel in a closed mold tooling system.
Figure 10:
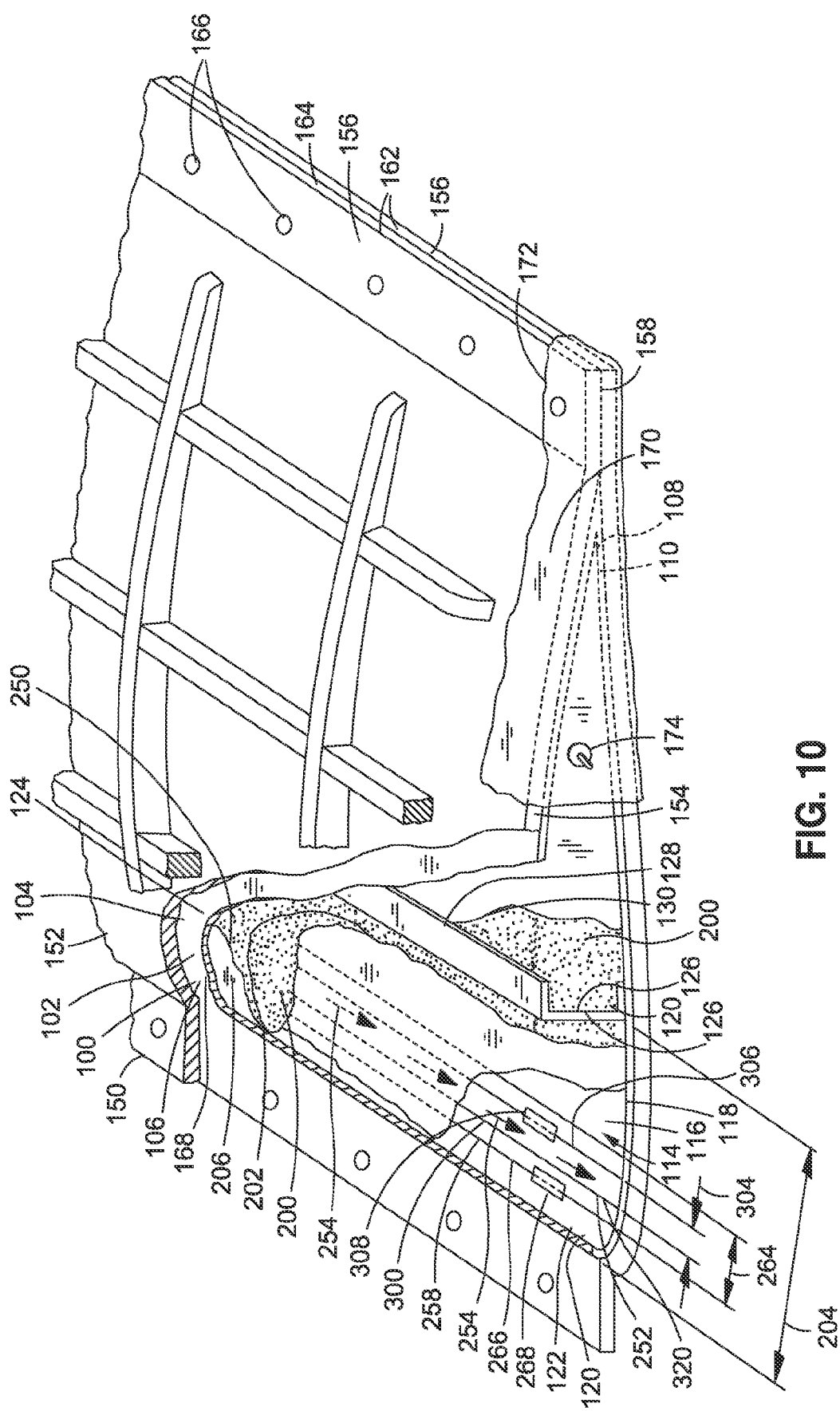
FIG. 10 is a cutaway perspective view of an embodiment of the tooling system illustrating the arrangement of components that make up the fluid flow channel.

Referring to the flow diagram of FIG. 9 with additional reference to the tooling system 150 of FIG. 10, shown in FIG. 9 are one or more operations that may be included in a method 400 of forming a fluid flow channel 252 (FIG. 10) in a vacuum bagging system 250 (FIG. 10) such as for a closed mold tooling system 150 (FIG. 10). The vacuum bagging system 250 may be implemented for processing a composite part 100 (FIG. 10) positioned within an OML tool 152 (FIG. 10) for consolidating and curing the composite part 100 into a unitized, monolithic structure. The composite part 100 may be comprised of composite material including laminates of uncured (e.g., prepreg) plies. The composite part 100 may have a three-dimensional geometry 130 defined by the skin 124 member (FIG. 10) and one or more internal components 126 (e.g., spar 128) shown in FIG. 10.

Step 402 of the method 400 of FIG. 9 may include mounting a contact layer 258 (FIG. 10) to a part inner surface 116 of the composite part 100. The composite part 100 may be installed within the OML tool 152 and positioned against an OML tool surface 154. The method may include removably securing the contact layer 258 to the composite part 100 using adhesive such as pressure-sensitive adhesive tape 270 (FIG. 10) or other means. The contact layer 258 may have a contact layer width 264 (FIG. 10) defined by opposing contact layer side edges 266 as described above. The method may include positioning the contact layer side edge 266 outside of an inside corner 120 (FIG. 10) of the composite part 100 such as within approximately 3.0 inches if a tangent line 122 (FIG. 10) of the inside corner 120. The method may include providing the contact layer 258 in a contact layer width 264 that may be less than the IML tool width 204 (FIG. 10). In an embodiment, the contact layer width 264 may be no greater than approximately 3.0 inches although larger widths are contemplated. The contact layer 258 may be provided in a contact layer thickness 260 (FIG. 7) of no greater than approximately 0.005 inch although larger thicknesses are contemplated. The method may include forming the contact layer 258 of polymeric material such as FEP.

Step 404 of the method 400 of FIG. 9 may include mounting one or more inner layers 300 (FIG. 10) to the contact layer 258. The method may include removably securing the inner layer 300 to the contact layer 258 at one or more discrete locations such as with pressure-sensitive adhesive tape 270 (FIG. 10), stitching, heat welding, or other means. The inner layer 300 may be positioned such that the inner layer width 304 is within the contact layer side edges 266. The method may include providing each one of the inner layers 300 at an inner layer thickness 302 (FIG. 7) of no greater than approximately 0.050 inch although greater thicknesses are contemplated. The contact layer 258/inner layer 300 assembly may be applied to the composite part 100 and extended along at least a portion of a length 112 of the composite part 100 to at least one part end 110 (FIG. 10) of the composite part 100.

Step 406 of the method 400 of FIG. 9 may include positioning an internal vacuum bag 206 (FIG. 10) within the part interior 114 and locating the internal vacuum bag 206 on a side of the inner layer 300 opposite the contact layer 258. The method may include providing the contact layer 258, the inner layer 300, and the internal vacuum bag 206 to have a total layer assembly thickness 322 (FIG. 7) of no greater than approximately 0.10 inch although larger thicknesses are contemplated. The method may include providing the internal vacuum bag 206 as an assembly comprised of two layers including a part-side bag layer 210 (FIG. 7) and a non-part side bag layer 212 (FIG. 7) in respective contact with the inner layer 300 and the IML tool 200. However, the internal vacuum bag 206 may be formed of more than two (20 layers. As indicated above, the internal vacuum bag 206 may cover or envelope the IML tool 200.

The positioning of the IML tool 200 and internal vacuum bag 206 within the part interior 114 of the composite part 100 may be facilitated by drawing a vacuum on an interior (not shown) of the internal vacuum bag 206 containing the IML tool 200 (e.g., bag carrier). The method may further include installing or assembling the internal vacuum bag 206/IML tool 200 with the composite part 100 while drawing the vacuum on the interior of the internal vacuum bag 206. The vacuum may draw the internal vacuum bag 206 against the sides of the IML tool 200 which may allow the IML tool 200 and internal vacuum bag 206 to fit within the part interior 114. Once the IML tool 200 and internal vacuum bag 206 are installed, the method may include halting the application of vacuum to the interior of the internal vacuum bag 206.

Step 408 of the method 400 of FIG. 9 may include sealing an external vacuum bag 170 (FIG. 10) over one or more tool ends 158 of the OML tool 152. The external vacuum bag 170 may be sealed over a tool end 158 by using a bag edge sealant 172 such as tape sealant or tacky tape. Vacuum fittings (not shown) may be mounted to the external vacuum bag 170. A vacuum fitting may be mounted to the external vacuum bag 170 for each one of the IML tools 200 of the composite part 100. The vacuum fittings may be fluidly coupled to a vacuum source 174 (FIG. 10).

Step 410 of the method 400 of FIG. 9 may include elevating a temperature of the composite part 100. The temperature of the composite part 100 may be increased by positioning the OML tool 152/composite part 100 within an autoclave (not shown) or a convection oven (not shown). Alternatively, the temperature of the composite part 100 may be elevated by applying heating elements (not shown) such as electrically resistive heating pads to an exterior of the OML tool 152. The elevation of the temperature of the composite part 100 may facilitate a reduction in the viscosity of the resin. Preferably, the increase in the temperature of the inner layer 300 to the processing temperature may occur without the inner layer 300 producing a gaseous or liquid by-product.

Step 412 of the method 400 of FIG. 9 may include drawing a vacuum on the tool interior 168 (FIG. 10). The vacuum may be drawn by opening a fluid connection at a vacuum fitting between the external vacuum bag 170 and the vacuum source 174. The tool interior 168 may include the region where the composite part 100 is located between the OML tool surface 154 and the internal vacuum bag 206.

Step 414 of the method 400 of FIG. 9 may include drawing fluid 254 (FIG. 10) such as gas out of the composite part 100 and into the fluid flow channel 252 as shown in FIG. 10. The fluid flow channel 252 may be defined by the contact layer 258, the inner layer 300, and the internal vacuum bag 206 as indicated above. Gas and other volatiles may be drawn out of the composite part 100 and into the fluid flow channel 252 in response to drawing the vacuum on the tool interior 168. Trapped air may also be drawn out of the tool interior 168 in response to drawing the vacuum.

Step 416 of the method 400 of FIG. 9 may include compacting the composite part 100 in response to drawing the vacuum on the tool interior 168. The drawing of the vacuum may facilitate the removal of trapped air, gas, and other by-products and fluids 254, and may promote the consolidation of the composite part 100. The drawing of the vacuum may also facilitate the movement of liquid resin (FIG. 10) such as along the fluid flow channel 252. In this regard, the fluid flow channel 252 may provide a path for movement of controlled amounts of liquid resin within the composite part 100 in a manner such that a substantially uniform internal compaction pressure may be applied to the fiber reinforcement of the composite part 100.

Step 418 of the method 400 of FIG. 9 may include curing the composite part 100 to form a cured composite article (not shown). In this regard, the composite part 100 may be held at a predetermined temperature profile and at a predetermined pressure profile for a predetermined period of time to allow for consolidation and curing of the composite part 100 into a unitized, monolithic composite article.

Advantageously, the vacuum bagging system 250 disclosed herein provides a means for fabricating monolithic composite articles having relatively tight geometry such as tight inner corners and/or relatively shallow sections (e.g., shallow airfoil section—FIG. 2) with improved dimensional accuracy finer contour details on the part inner surfaces 116. In this regard, the fluid flow channel 252 disclosed herein provides a relatively narrow, selectively-located, gas and liquid flow path which allows for a reduced gap between the IML tool 200 and the inner mold line of the composite part 100. The fluid flow channel 252 is advantageously provided by a chemically compatible, multi-material, internal vacuum bag 206 in combination with a chemically-compatible contact layer 258 and inner layer 300.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of forming a fluid flow channel in a vacuum bagging system, comprising the steps of:
   mounting a strip of contact layer along a first portion of a part inner surface of a composite part formed of pre-impregnated fiber-reinforced material and positionable within an outer mold line tool, the strip of contact layer extending from a part interior of the composite part to at least one part end of the composite part and having a contact layer width defined by opposing contact layer side edges, the strip of contact layer being located adjacent to and outside of a second portion of the composite part such that an internal vacuum bag applies vacuum pressure directly onto the part inner surface of the second portion not covered by the strip of contact layer;
   mounting a strip of inner layer to the strip of contact layer, the strip of inner layer having an inner layer width that is no greater than the contact layer width and being positioned between opposing contact layer side edges;
   extending the contact layer to at least one part end of the composite part; and
   positioning an internal vacuum bag on an interior of the part inner surface such that the internal vacuum bag is located on a side of the inner layer opposite the contact layer, the internal vacuum bag covering an inner mold line tool having an inner mold line tool width, the contact layer width of the strip of contact layer being less than the inner mold line tool width.

2. The method of claim 1 further comprising the step of:
   drawing a vacuum on a tool interior between the part inner surface and the internal vacuum bag; and
   drawing fluid along the fluid flow channel in response to drawing the vacuum on the tool interior.

3. The method of claim 2 wherein the step of drawing the vacuum on the tool interior comprises:
   sealing an external vacuum bag over a tool end of the outer mold line tool.

4. The method of claim 1 further comprising the step of:
   compacting the composite part positioned between an outer mold line tool surface and the internal vacuum bag in response to drawing the vacuum.

5. The method of claim 1 further comprising the step of:
   removably securing the contact layer to the part inner surface of the composite part at one or more discrete locations.

6. The method of claim 1 further comprising the step of:
   providing the contact layer in a contact layer width of no greater than approximately 3 inches.

7. The method of claim 1 further comprising the step of:
   providing the contact layer at a contact layer thickness of no greater than approximately 0.005 inch.

8. The method of claim 1 further comprising the step of:
   providing the inner layer at an inner layer thickness of no greater than approximately 0.050 inch.

9. The method of claim 1 further comprising the step of:
   providing the contact layer, the inner layer, and the internal vacuum bag such that a total layer assembly thickness is no greater than approximately 0.10 inch.

10. The method of claim 1 further comprising the step of:
    providing the internal vacuum bag as an assembly of at least two layers including a part-side bag layer and a non-part side layer, the part-side bag layer being in contact with the inner layer, the non-part side layer being in contact with the inner mold line tool.

11. The method of claim 1 wherein the step of positioning an internal vacuum bag on a side of the inner layer comprises:
    drawing a vacuum on an interior of the internal vacuum bag;
    installing the internal vacuum bag and the inner mold line tool within the composite part while drawing the vacuum on the interior of the internal vacuum bag; and
    halting the vacuum applied to the interior of the internal vacuum bag.

* * * * *